United States Patent [19]

Wenner

[11] 4,078,032

[45] Mar. 7, 1978

[54] METHOD AND APPARATUS FOR FABRICATING A CONTINUOUS LENGTH OF CLEATED BELTING

[76] Inventor: Ralph B. Wenner, 2808 Westchester Rd., Toledo, Ohio 43615

[21] Appl. No.: 792,775

[22] Filed: May 2, 1977

[51] Int. Cl.² .................. B29H 5/01; B29H 7/22; B29C 3/02

[52] U.S. Cl. .................. 264/167; 156/137; 156/138; 156/140; 156/245; 156/297; 156/306; 156/324; 264/171; 264/248; 264/251; 264/254; 264/257; 264/259; 264/296

[58] Field of Search ............ 264/167, 250, 171, 251, 264/259, 254, 248, 266, 296; 100/221, 222; 425/406, 451, 453; 156/245, 297, 306, 539, 543, 552, 581, 137, 138, 140, 324, 311

[56] References Cited

U.S. PATENT DOCUMENTS

| 2,718,030 | 9/1955 | Collins et al. | 425/451 |
|---|---|---|---|
| 2,859,477 | 11/1958 | Millhoff | 425/451 |
| 3,482,004 | 12/1969 | Anderson | 264/250 |
| 3,860,684 | 1/1975 | Vance | 156/140 |
| 3,895,895 | 7/1975 | Marker | 425/406 |
| 3,897,291 | 7/1975 | Hoback et al. | 264/167 |

*Primary Examiner*—Willard E. Hoag
*Attorney, Agent, or Firm*—Henry K. Leonard

[57] ABSTRACT

A method and apparatus for fabricating continuous lengths of cleated belting. The method includes the steps of feeding a continuous length of belting base material alternately forwardly with or over and backwardly with, a cleat positioning mold first into, then out of and then through the space between vertically moveable press platens. The cleats are assembled with and cured to the base material in longitudinally adjacent groups. Each group of raw cleats and a corresponding section of the base material is moved with the mold forwardly into the press, cured, and then moved rearwardly with the mold out from between the press platens. The cured section is separated from the mold. A new group of uncured cleats is positioned for a succeeding section. The base material, including the cured section, is moved forwardly relative to the mold until the last cured cleat of the group of cured cleats is positioned at the first of the cleat positions of the mold. This moves the succeeding section of the base material over the mold and the raw cleats. The mold, the new group of raw cleats and the succeeding section of the base material then are moved into the press for curing with the preceding cured section being moved beyond the press.

The apparatus comprises the press, the moveable mold, the mechanisms for reciprocating the belting base and the mold and mechanism for separating molded sections sequentially in order to carry out the process.

12 Claims, 27 Drawing Figures

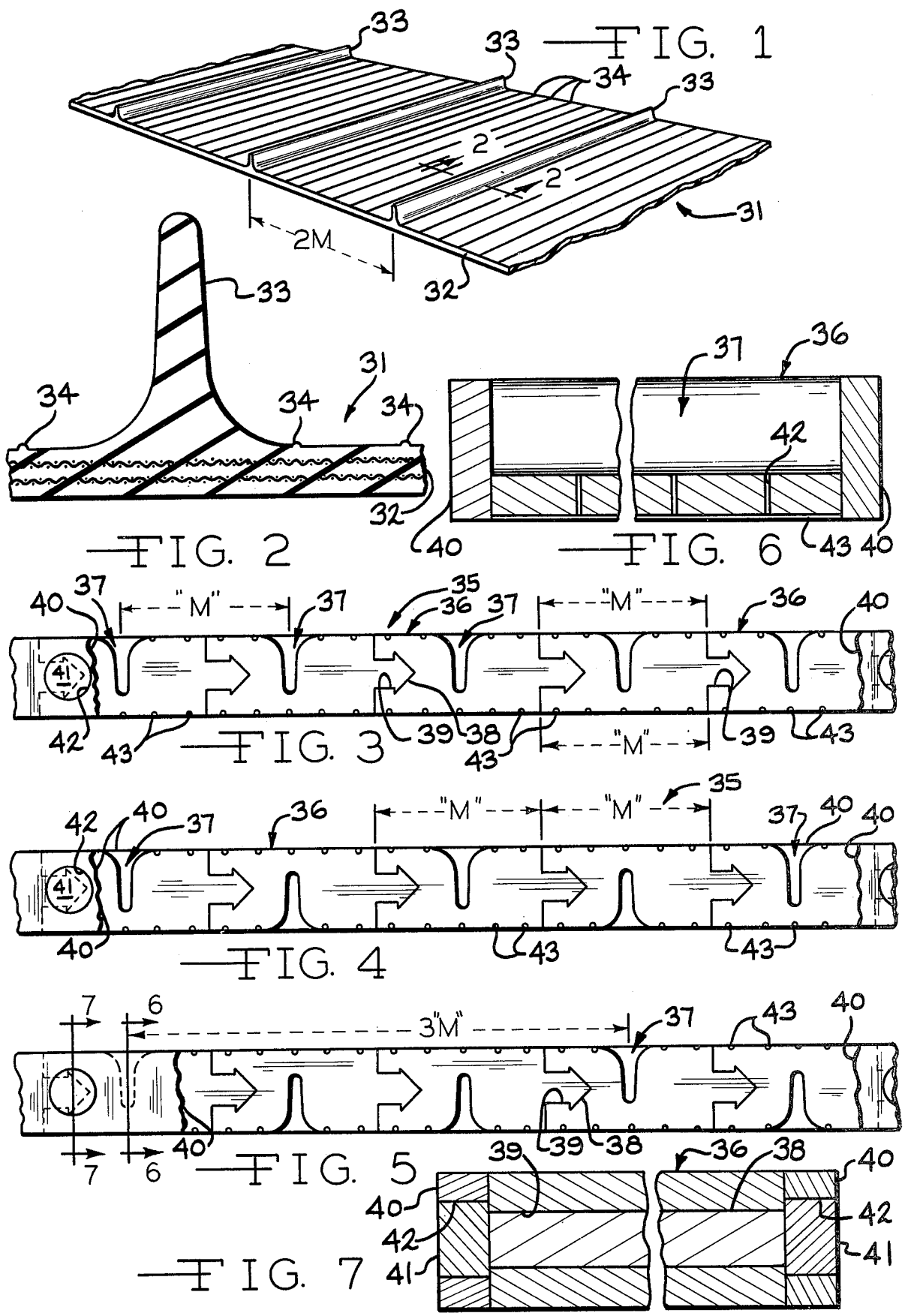

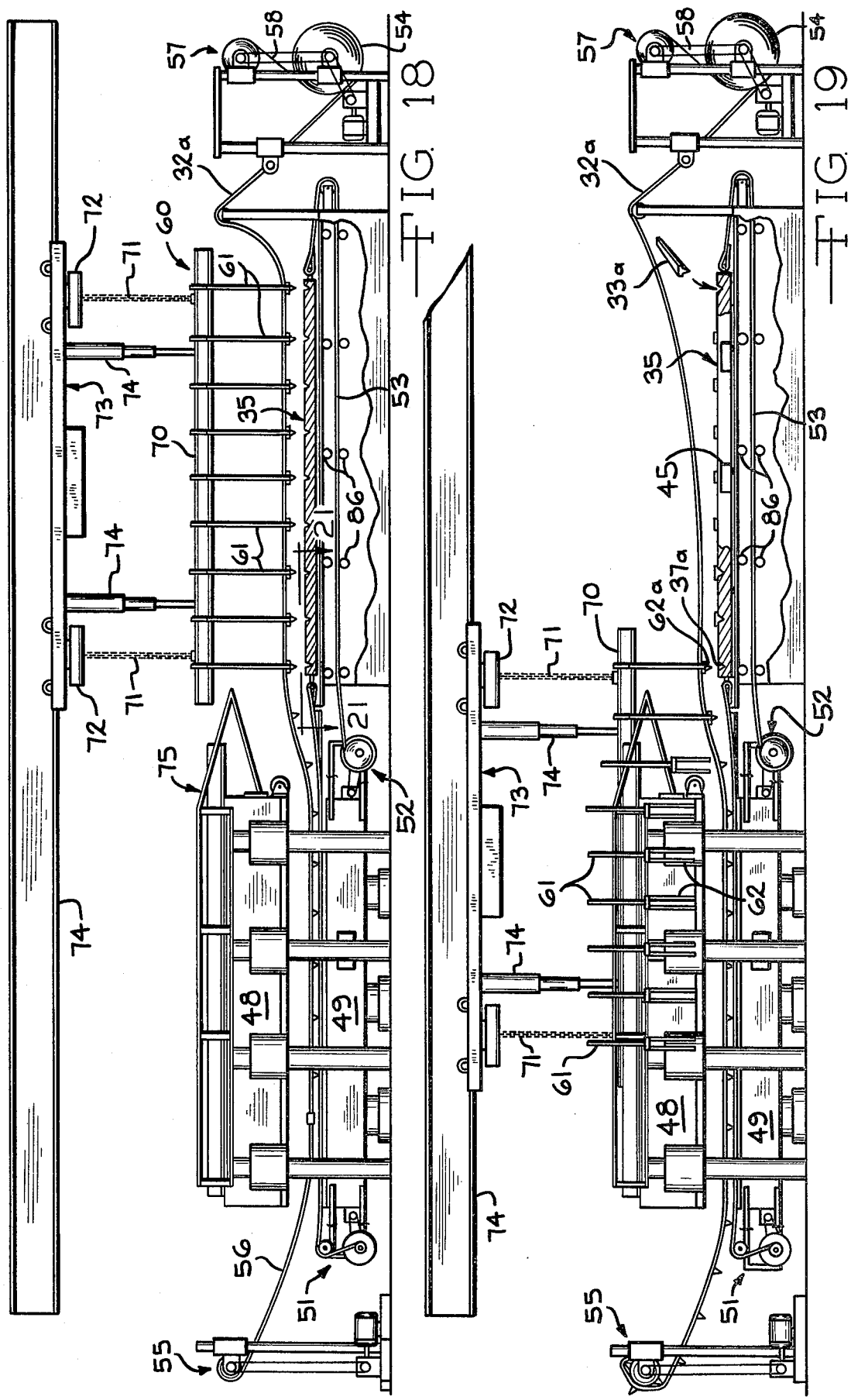

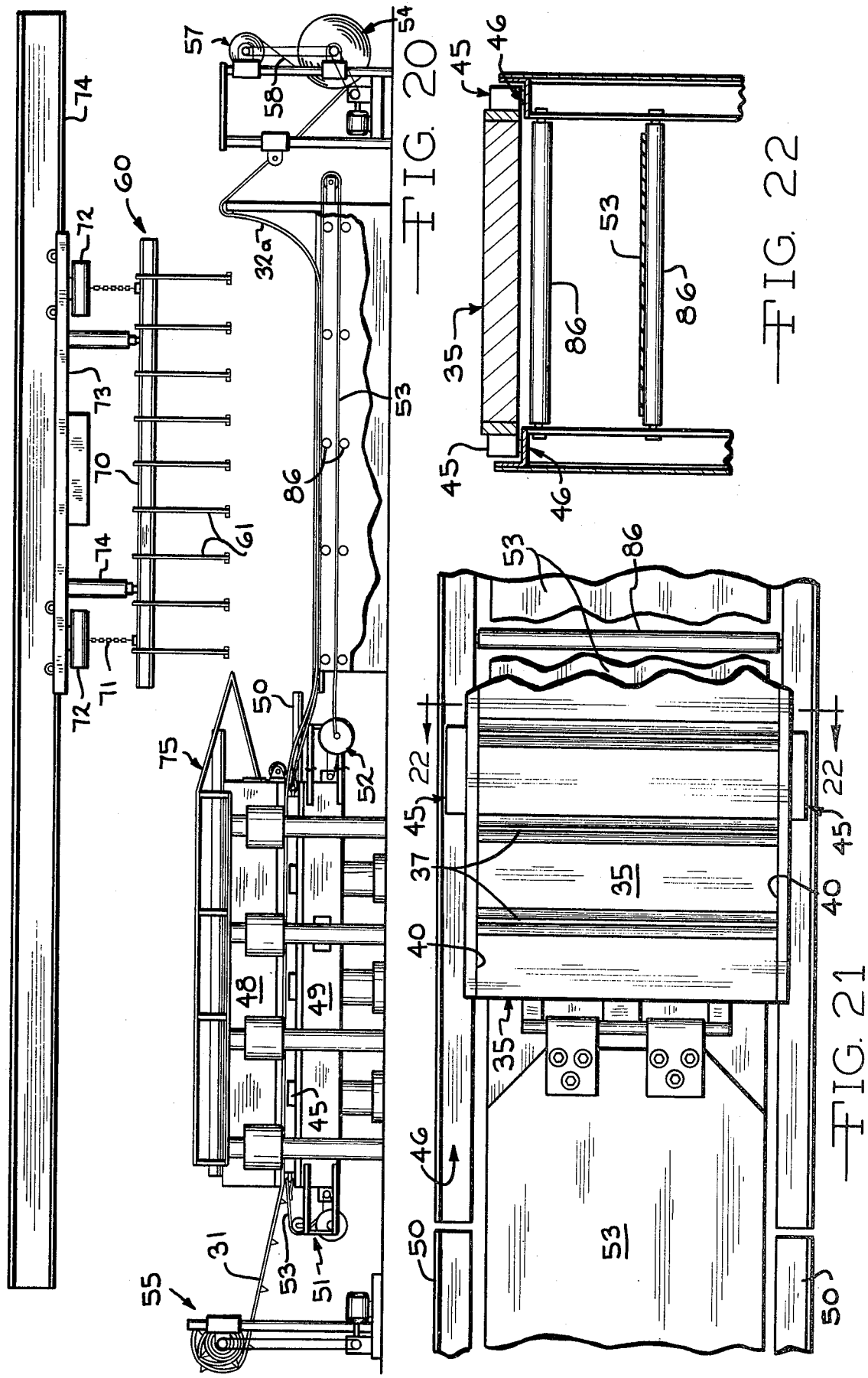

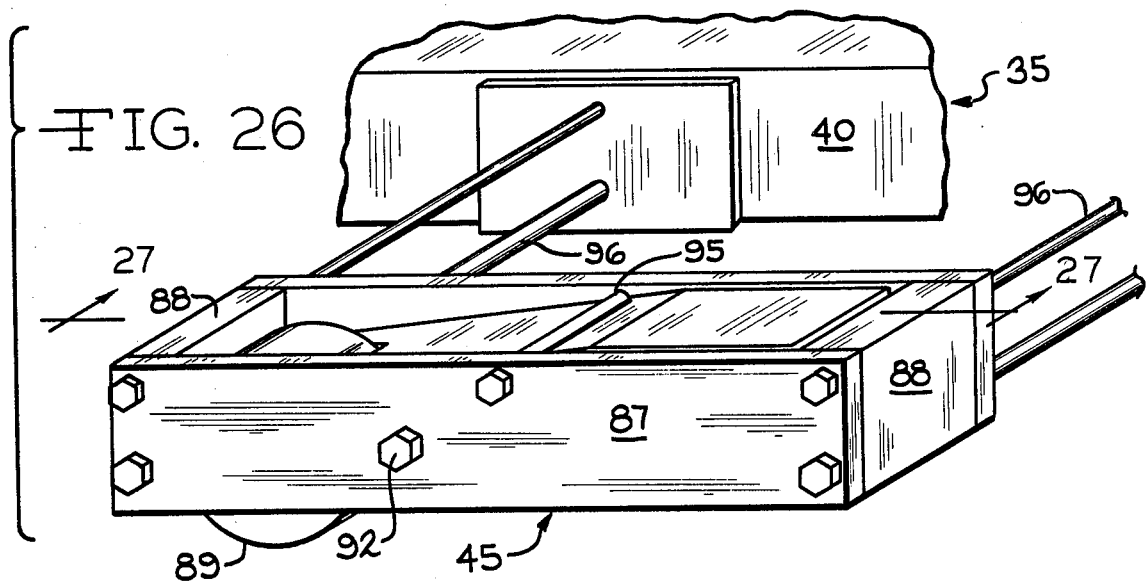
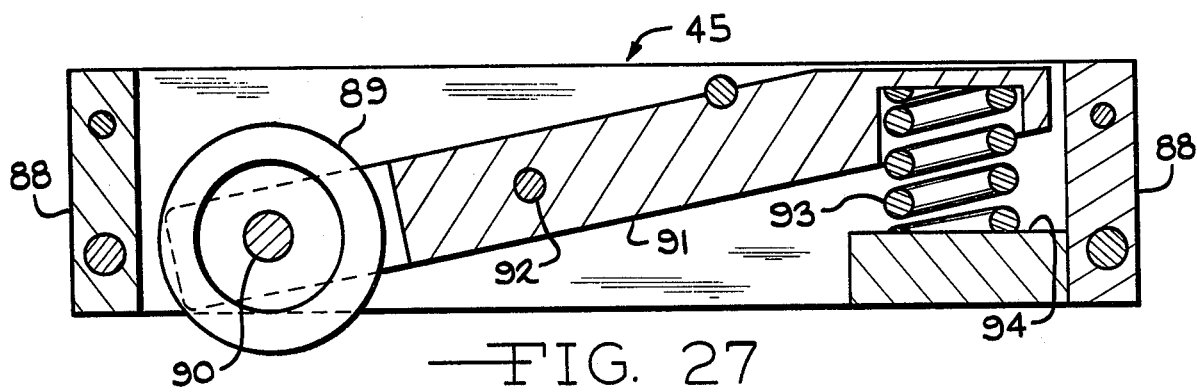

METHOD AND APPARATUS FOR FABRICATING A CONTINUOUS LENGTH OF CLEATED BELTING

BACKGROUND OF THE INVENTION

Cleated belts of the type with which the instant invention is concerned are used for the most part as conveyor belts, the cleats serving to retain the materials being conveyed, even when the belt moves along pathways rather sharply inclined to the horizontal. The width of such belts, the height of the cleats above the surfaces of the belts, the shapes of the cleats and the spacing of the cleats from each other along the lengths of the belts all are determined by the nature of the materials being conveyed. For examples, for cartons the cleats need only be high enough above the belt surface to catch the corners of the cartons and spaced only a sufficient distance to enable one or more cartons (as desired) to be placed in each of the intervals between cleats; for particulate material, the cleats would be of such size, shape and spacing as to enable quantities of the material to be deposited between them at the rate desired for feeding that particular material. If measured charges of particulate or pulverulent material were to be fed by such a belt, the material could be fed on to the surface of the belt and the belt could pass beneath what might be called a "doctor blade" sweeping across the tops of the cleats, thus leaving a measured charge between successive cleats.

Most cleated belting is fabricated from continuous lengths of reinforced belting base, i.e., a relatively thin, continuous, fabric reinforced rubber or rubber-like material of the desired width, to which the cleats are vulcanized. It will be appreciated, therefore, that molds for the fabrication of a particular configuration of cleated belting must be able to withstand the pressures and temperatures required for such treatment.

It also has been necessary to have a specific mold for each length of a cleated belt to be fabricated for each particular spacing of cleats, even of the same configuration, each mold being relatively expensive and utilizable only for that particular spacing.

The fabrication of continuous lengths of cleated belting has been done before by progressively feeding a web of backing between the vertically separable, heated platens of a press, one of the platens carrying a mold having recesses complementary to the cleats. However, after each section of the belt was cured, it was necessary for the operators to reach into the relatively small space between the heated platens, after they had been separated, in order, first, to pry the cured cleats out of the recesses and, second, to insert new uncured cleat material into the recesses for the next section of the belt. Working in the limited space between the hot press platen and mold was not only difficult but also was dangerous.

It is, therefore, one of the principal objects of the instant invention to provide a method for the fabrication of continuous lengths of cleated belting.

Another principal object of the instant invention is to provide an apparatus for the fabrication of continuous lengths of cleated belting.

BRIEF DESCRIPTION OF THE DRAWINGS

FIG. 1 is a fragmentary view in perspective of a length of cleated belting which is fabricated by the method and on the apparatus of the instant invention;

FIG. 2 is a fragmentary, vertical sectional view on a greatly enlarged scale, taken along the line 2—2 of FIG. 1 being illustrated at an approximate actual product size of one type of a commercial cleated belting;

FIG. 3 is a fragmentary side view of a carriage mold arranged for fabricating cleated belting having the cleats spaced a single modular distance apart;

FIG. 4 is a view similar to FIG. 3 but showing the mold elements arranged for the fabrication of cleated belting having the cleats spaced two modular distances apart;

FIG. 5 is a view similar to FIGS. 3 and 4 illustrating how the mold elements are assembled for fabricating a cleated belting embodying the invention in which the cleats are spaced three modular distances from each other;

FIG. 6 is a fragmentary, vertical sectional view taken along the line 6—6 of FIG. 5 and shown on an enlarged scale;

FIG. 7 is a view similar to FIG. 6 but taken along the line 6—6 of FIG. 5;

FIG. 18 is a side view in elevation, with parts broken away, showing an apparatus embodying the invention upon which the method of the invention readily can be carried out, the parts of the apparatus being illustrated in this figure in the same relative position as they are shown in FIG. 14; the cleated belt in FIG. 18, however, being illustrated as having two consecutively molded sections rather than one, as shown in FIG. 14;

FIG. 19 is a view similar to FIG. 17 but illustrating the parts of the apparatus in approximately the same position as is shown in FIG. 16;

FIG. 20 is a view similar to FIGS. 18 and 19 and illustrating the parts of the apparatus substantially in the same position as is diagramatically illustrated in FIG. 17;

FIG. 21 is a fragmentary, horizontal plan view taken along the line 21—21 of FIG. 18 and shown on an enlarged scale;

FIG. 22 is a fragmentary, vertical sectional view taken along the line 22—22 of FIG. 21;

FIG. 26 is a greatly enlarged, exploded view in perspective of a mold caster; and FIG. 27 is a vertical sectional view taken along the line 27—27 of FIG. 26 and shown on an enlarged scale.

DESCRIPTION OF PREFERRED EMBODIMENT

Figure 8:
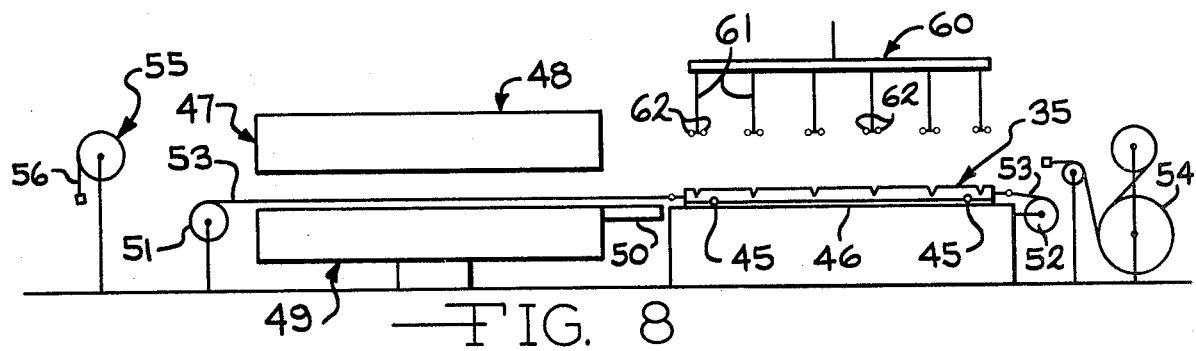
FIGS. 8-17, inclusive, are simplified views in sequence illustrating the step-by-step practice of a method according to the invention and serving also to illustrate in a simplified manner an apparatus embodying the invention.

FIG. 1 shows a fragment of a cleated belt of the type with which the instant invention is involved. Such a belt, generally indicated by the reference number 31, has a main web 32, a plurality of upstanding, spaced cleats 33, and small intermediate ribs 34. In discussing the method for fabricating a belt 31 and describing an apparatus upon which it can be fabricated according to the invention, the reference number 31 will be used when referring to a finished cured belt section and that portion of the finished belt identified as a web 32 prior to and during processing will be called a "base belt material". Similarly, finished cleats 33 will be so identified while uncured stock material from which the cleats 33 are molded to the belt base material will be referred to as "raw cleats".

The method of the invention is one by which the belt base material, eventually to form the belt web 32, and the raw cleat lengths, eventually to form the cleats 33, are associated with each other in proper spacing and orientation and are subjected to heat and pressure in order to cure the material from which both are fabricated to provide continuous lengths of the finished belting 31 rather than individual pieces of finite length even though the process includes a step-by-step fabrication of adjacent sections of the continuous finished belt 31.

As can best be seen by reference to FIG. 2, the web 32 is reinforced by one or more layers of reinforcing fabric and during fabrication the materials forming the cleats 33 and the web 32 are vulcanized together into an integral structure.

In order to enable the fabrication of cleated belts having cleats 33 of the same cross sectional configuration as shown in FIG. 2, but spaced from each other different distancea on the belt 31, the method and apparatus of the invention utilize a modular style mold which is illustrated in FIGS. 3-7, inclusive.

A mold suitable for use according to the invention is generally indicated by the reference number 35 and is shown as being assembled from a number of individual modular units 36. Each of the units 36 might have a width, indicated by the letter "M", for example, of 12 inches and a length equal to the width of the belt to be fabricated. Each of the units 36 has a centrally located, cleat forming recess 37 in one of its major faces. Each of the recesses 37 is complementary in cross sectional shape to the cross sectional shape of a finished cleat 33. The opposite major face of the unit 36 is generally planar. As can be seen in FIG. 3, when all of the modular units 36 are positioned with their recesses 37 turned upwardly, the recesses 37 and thus the cleats 33 to be molded onto a finished belt 31 are spaced from each other the distance "M".

Each of the modular mold units 36 has means along its front and rear lateral edges for interengagement with complementary means on adjacent units 36. These means in the illustrated embodiment are transversely elongated spearpoints 38 and matching slots 39. Thus when it is desired to assemble a mold 35 for the fabrication of a cleated belt having its cleats 33 spaced one modular distance from each other longitudinally along the belt 31, the modular mold units 36 are slid together with all of their recesses 37 turned upwardly as in FIG. 3. After assembly in this arrangement, side plates 40 are positioned along each side of the finished mold 35, i.e., adjacent to the ends of the units 36, and welds 41 are made through apertures 42 in the side plates 40 to permanently make unitary the entire structure of the mold 35.

While only a fragment of a mold 35 is illustrated in each of FIGS. 3, 4, and 5, there being only five of the modular mold units 36 shown, it will be appreciated that a number of units 36 from which an individual mold 35 is fabricated is determined by the selected modular distance "M" and the overall length of the individual mold to be constructed in order to fabricate a section of a continuous belt 31. Thus in the schematic views of FIGS. 8-17, inclusive, six cleat molding recesses 37 are shown while nine such recesses are shown in FIGS. 18-20, inclusive, which more completely illustrate an apparatus according to the invention.

Vent holes 42 are drilled through the body of each of the modular mold units 36 from the bottom of each recess 37 in order to prevent the entrapment of air beneath a raw cleat length which is inserted into each of the recesses 37 during the method of the invention. In addition, both major faces of each modular mold unit 36 have uniformly spaced slots 43 for the molding of the intermediate ribs 34.

When it is desired to fabricate a continuous cleated belt in which the cleats 33 are spaced from each other two or more modular distances "M", the mold 35 is assembled from a number of the modular units 36 with some of the recesses 37 turned downwardly. For example, as illustrated in FIG. 4, when the finished belt 31 is to have cleats 33 which are spaced two modular distances from each other, alternate ones of the units 36 are turned upwardly with the intervening units turned downwardly. Thus the cleat recesses 37 which are facing upwardly for the reception of raw cleat material are spaced 2 "M" from each other as shown in FIG. 4. Similarly, if it is desired that the finished belt shall have its cleats spaced three modular distances from each other, two adjacent ones of the modular units 36 are turned with their cleat recesses 37 downwardly between each spaced pair of units 36 having their recesses 37 turned upwardly, as illustrated in FIG. 5.

Therefore, in order to fabricate cleated belting having cleats 33 of the same cross sectional configuration but with the cleats 33 spaced from each other longitudinally along the belt any multiple of a modular distance, such as 12 inches, or 6 inches or any other distance, it is necessary to have only one size of modular mold unit 36 as described and to assemble the units 36 adjacent each other with their cleat molding recesses 37 turned upwardly or downwardly as the case might be.

METHOD

In carrying out the method for fabricating a continuous length of cleated belting according to the invention, the belting is made in a series of adjacent lengths or sections, each section being assembled and cured individually, but each successive section being continuous relative to preceeding sections and to following sections. The method steps are illustrated in FIGS. 8-17, inclusive, and in the illustrations a mold 35 as described above is utilized. The unitary mold 35 travels on casters 45 and might be called a mold carriage so that it can be reciprocated along a longitudinally extending carriageway generally indicated by the reference number 46. The carriageway is aligned with a press 47 which has a stationary upper platen 48 and a vertically moveable lower platen 49. The lower platen 49 has a carriageway extension 50 onto which the mold 35 is moved on route from its external carriageway 46 into the space between the mold platens 48 and 49.

The mold 35, itself, is reciprocated between the external position illustrated in FIG. 1 and the space between the mold platens 48 and 49 by powered winches 51 and 52, each of which has a cable 53 which is connected to the front or rear of the mold 35 (left or right in FIGS. 8-17). Thus, by energizing the winches 51 and 52 the mold 35 either can be pulled off of its external carriageway 46 into the space between the platens 48 and 49 or out from that space and back onto the external carriageway 46.

A supply 54 of belt base material 32a is mounted at the outer end of the apparatus whence it can be lead forwardly over the mold 35 and, with the mold 35, into the space between the press platens 48 and 49. After curing, the finished belting 31 comprising the molded length is then wound up upon a powered take-up drum generally indicated by the reference number 55 which is located beyond the press 47.

Figure 9:
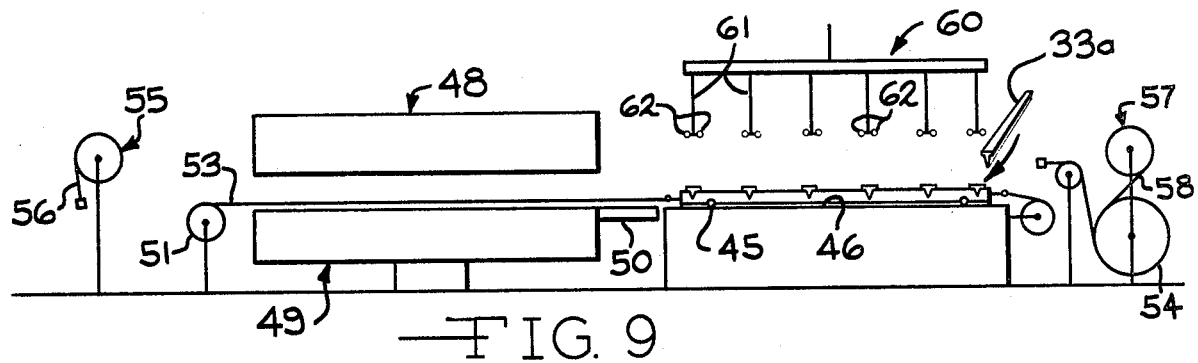
Figure 10:
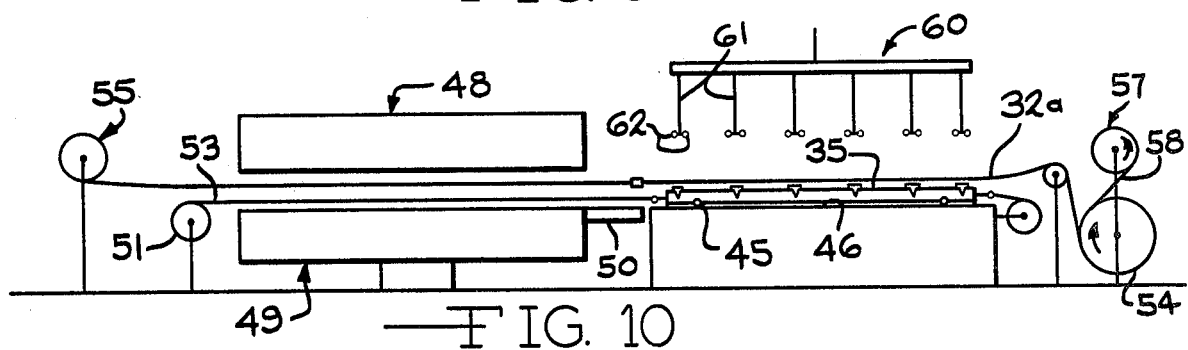

In carrying out the method of the invention, the mold 35 is first positioned on its external carriageway 46 as shown in FIG. 8. Lengths of raw cleat material 33a are then placed in each of the cleat recesses 37 as shown in FIG. 9. A length of cable-like pulling belt 56 is then unwound from the take-up drum 55, fed through the space between the press platens 48 and 49 and connected to the leading end of the base belt material on the supply 54. The drum 55 is then energized to pull a length of base material 32a (FIG. 10) off of the supply 54 a distance sufficiently far so that it completely overlies the mold 35 and the raw cleats 33a as shown in FIG. 10. Simultaneously with this extension of the belt base material 32a to the position illustrated in FIG. 10, a take-up drum 57 is powered to wind up an interleaved web 58 which normally is wound between successive layers of the uncured belt base material 32a on the supply 54.

The winch 51 is then energized to pull the mold 35 into the space between the press platens 48 and 49 and, concomitantly therewith, the take-up drum 55 also is driven to pull the belt base material 32a along with the mold 35 into that space. The lower press platen 49 is then raised to squeeze the belt base material 32a downwardly against the raw cleats 33a and the two platens 48 and 49 are suitably heated in order to vulcanize the raw cleats 33a to the base material 32a.

Figure 11:
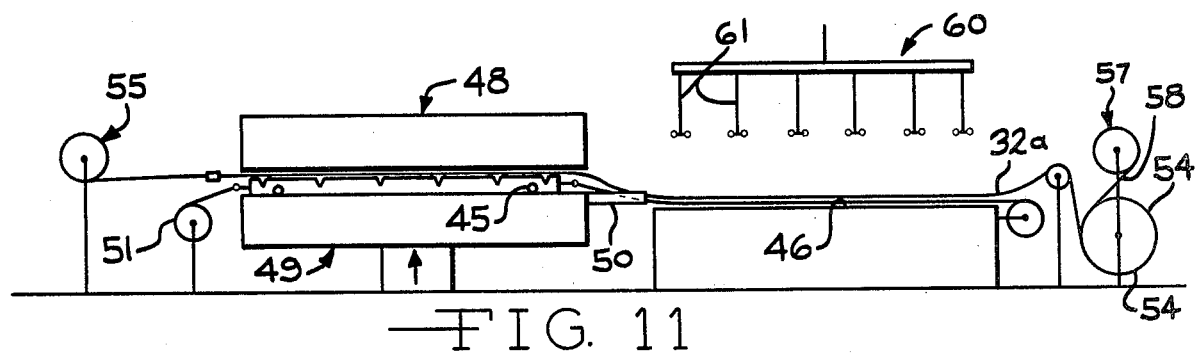
Figure 12:
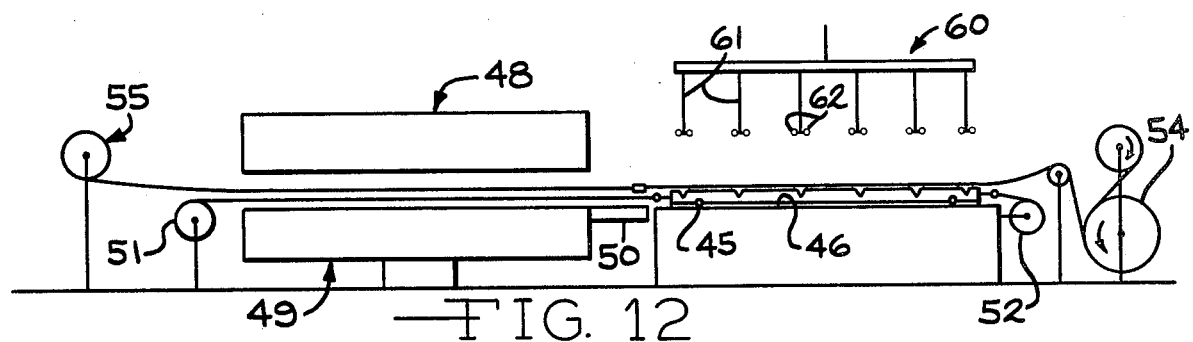

After completion of the vulcanizing step as illustrated in FIG. 11, the press platens 48 and 49 are opened and the winch 52 is energized to pull the mold out from between the platens 48 and 49 and back onto the carriageway 46. Simultaneously therewith, power is applied to the drum 54 of the base belt material to rewind the uncured portion thereof back on to the supply 54 until the now-cured section of the belt 31 is located as shown in FIG. 12.

An overhead mechanism generally indicated by the reference number 60 is then brought into play for the purpose of lifting the cured section of the belt 31 upwardly relative to the mold 35 to remove the cured cleats 33 from the recesses 37. In an apparatus according to the invention, as utilized to carry out the method of the invention, this overhead mechanism 60 comprises a plurality of depending arms 61, there being one arm 61 for each of the cleats 33 in the section of the belt just cured at each side of the mold 35. The arms 61 have suitable inwardly extending fingers 62 which are adapted to be inserted inwardly from opposite sides of the mold 35 beneath the web 32 of the cured belt section on opposite sides of the individual cleats 33. After such insertion has been done, the entire mechanism 60 is raised as shown in FIG. 14 in order to lift the cured section of the belt 31 upwardly away from the mold 35.

Figure 14:
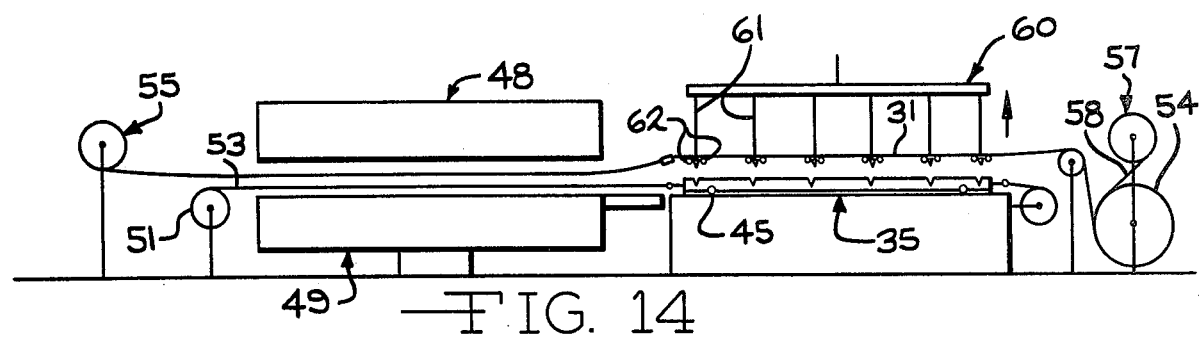
Figure 15:
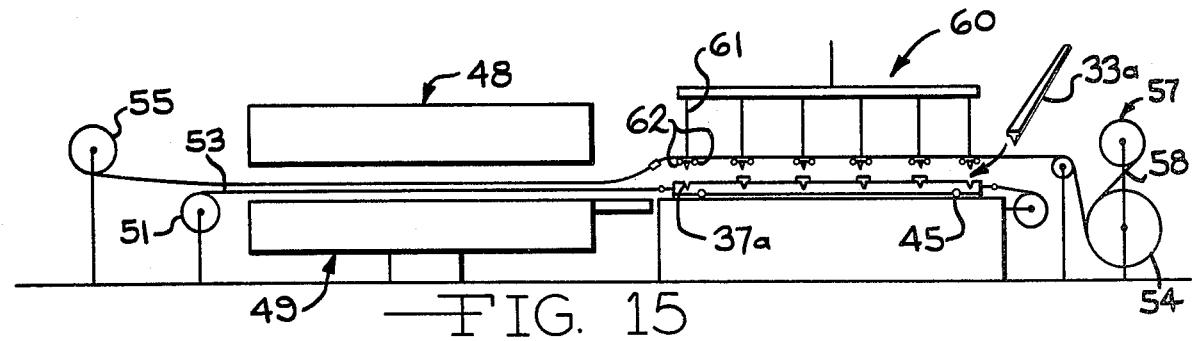
Figure 16:
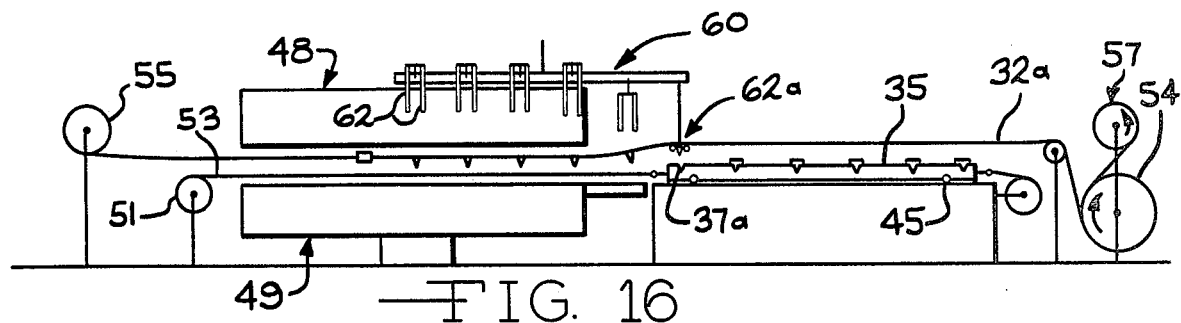
Figure 17:
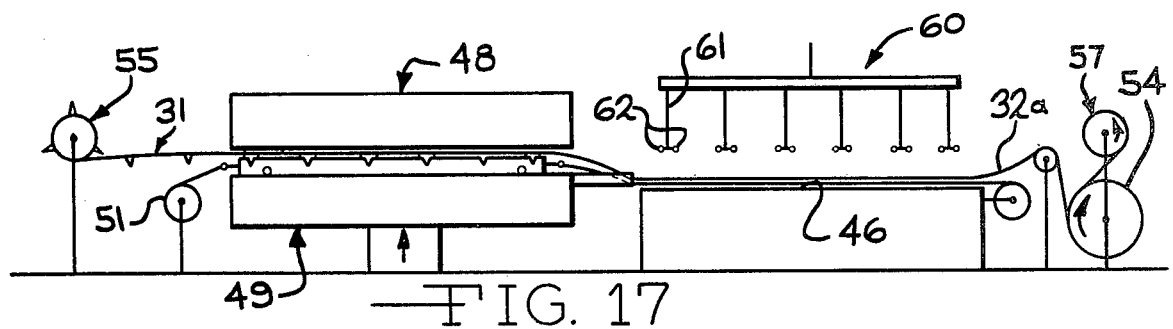

After the cured section of the belt 31 is lifted upwardly by the mechanism 60, removing the cured cleats 33 from their recess 37, as illustrated in FIG. 14, a new set of raw cleats 33a is inserted into all of the cleat recesses 37 except for the first of such recesses, i.e., that recess indicated by the reference number 37a in FIG. 15. The take-up drum 55 is then energized to pull the cured section of the belt 31 through the space between the press platens and to feed a second uncured section of belt base material 32a forwardly over the mold 35 until the last one of the cured cleats 33 reaches a position overlying the empty cleat recess 37a as is illustrated in FIG. 16. During the movement of the cured section of the belt 31 from the position shown in FIG. 15 to the position shown in FIG. 16, the arms 61 and fingers 62 are disengaged from beneath the cured section of the belt 31 and the last one of the cured cleats 31 is lowered into the empty cleat recess 37a.

The take-up drum 55 and the winch 51 are then energized to pull the mold 35 and the overlying length of the uncured belt base material 32a into the space between the press platens 48 and 49 and the lower platen 49 is moved upwardly to once again vulcanize the raw cleats 33a to the base belt material 32a. The overhead mechanism 60 is returned to its outer position overlying the mold carriageway 46.

After this second section of the belt 31 has been cured, the steps illustrated in FIGS. 12-17, inclusive, are repeated with each series of steps producing another cured section until a substantial continuous length of the cleated belting 31 has been wound upon the powered take-up drum 55.

While this method is spoken of as producing a continuous length of the cleated belting, it is apparent, of course, that such a continuous length of belting 31 must have an end and, therefore, the number of sequentially cured sections of such a belt which may be produced is dependent upon the maximum length which can be taken up on the drum 55 and handled as a unit. The primary contrast between the method of the invention and those methods previously used lies in the fact that both cured sections of cleated belting are stripped out of the mold and uncured cleat stock inserted into the mold recesses out in the open rather than in the confined, hot space between the press platens. In addition, of course, different mold carriages may be placed on the carriageway 46 whenever desired more easily than different stationary molds could be mounted on the lower press platen 49.

While the method of the invention has been described with respect to a mold comprising modular units it will be appreciated that this particular mold is not necessary for the method of the invention and, if desired, a unitary mold with all of the cleat recesses formed in a single, massive structure maybe utilized. While the overhead mechanism 60 has been described as comprising arms and fingers and the various winches, rollers, and so forth have all been described with respect to their mode of operation, it also will be appreciated that these are suggested mechanisms for carrying out the method and other mechanisms whereby the method can be carried out may be substituted for any of them as desired. The method of the invention consists merely of the sequence of steps described without being limited to the utilization of any of the particular apparatus referred to in that description.

APPARATUS

FIGS. 18-27 illustrate an apparatus embodying the invention upon which the method of the invention readily can be carried out.

As earlier explained, FIG. 18 shows an apparatus embodying the invention with the various parts thereof in the position illustrated in FIG. 14 relative to the method. Similarly, FIG. 19 shows the apparatus substantially in the position earlier illustrated in FIG. 16 and FIG. 20 shows the apparatus in the position earlier illustrated in FIG. 17.

In FIGS. 18, 19 and 20 parts already identified by reference numbers in the discussions of the method as illustrated in FIGS. 8–17, inclusive, are similarly numbered and additional reference numbers are applied only where necessary to further amplify the description of any of these structures, subassemblies or parts.

Figure 13:
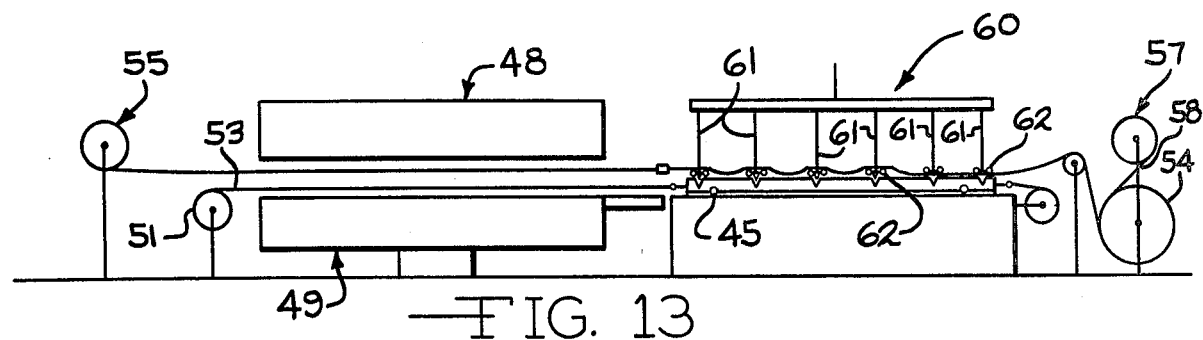
Figure 24:
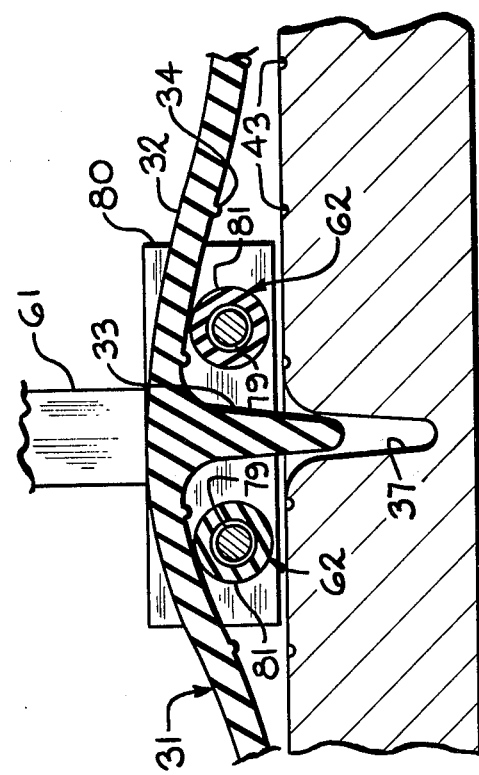
FIG. 24 is a greatly enlarged fragmentary, vertical sectional view taken along the line 24—24 of FIG. 23.
Figure 23:
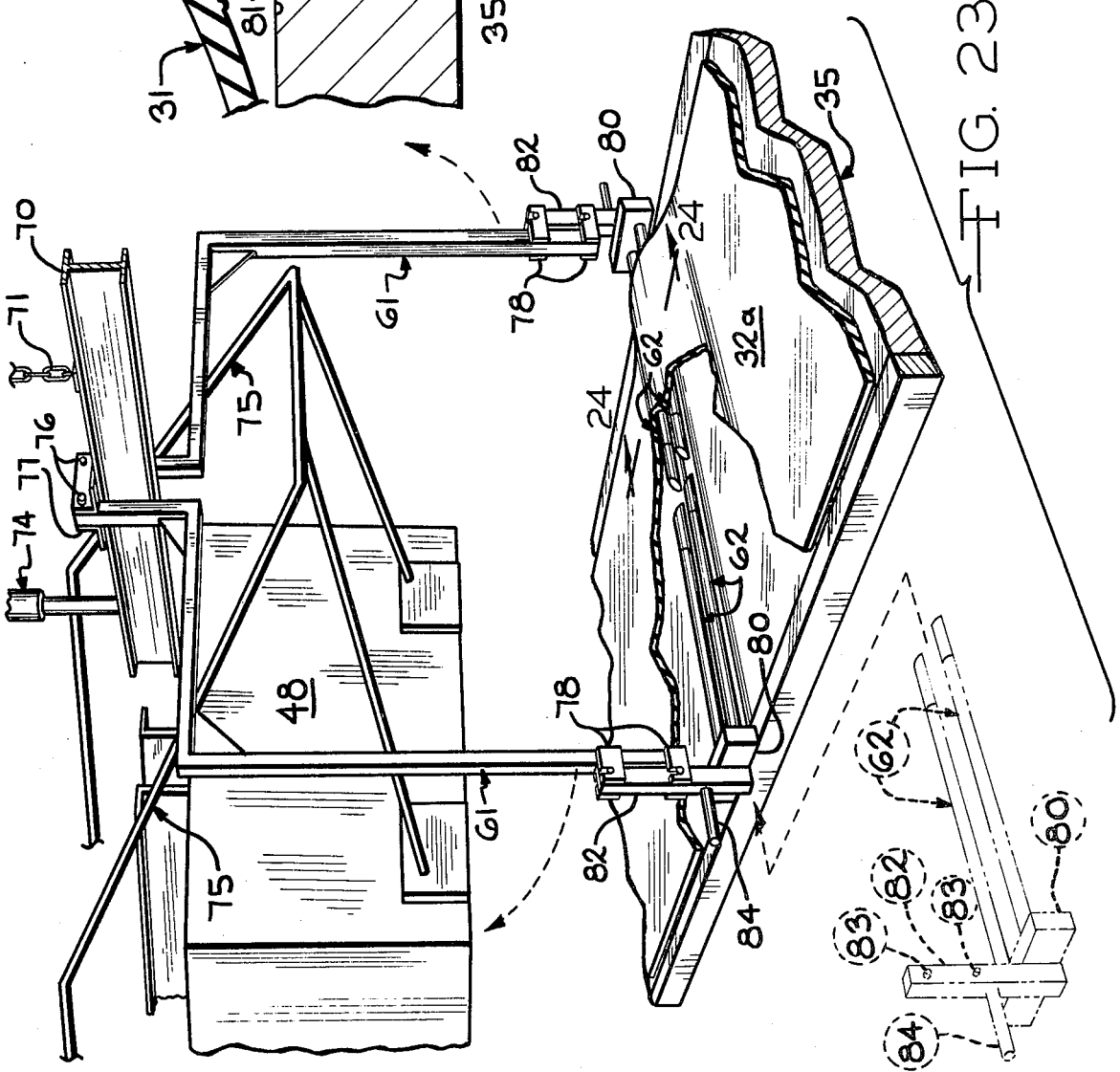
FIG. 23 is a fragmentary, perspective view, with parts broken away, illustrating the operation of means for lifting a cured section of a belt fabricated according to the invention from the mold carriage.

The overhead mechanism generally referred to by the reference number 60 comprises a longitudinally extending beam 70 (see also FIG. 23) which is suspended by two chains 71 from power hoists 72. The hoists 72 are attached to a trolley 73 which runs on an overhead track 74. Vertical movement of the mechanism 60 is guided by telescoping guides 74. When the hoists 72 are energized, the entire mechanism 60, its arms 61 and its fingers 62 are raised or lowered as the case might be between the upper most position (FIGS. 8–12 and 20), an intermediate position (FIGS. 14, 15, 17 and 18) and a lowermost position (FIGS. 13, 23 and 24). The trolley 73 includes a drive mechanism (not shown) by which the trolley is moved back and forth between the respective positions illustrated in FIGS. 14 and 18 (out) and a position just to the left of that shown in FIGS. 16 and 19 i.e., sufficiently far overlying the press platen 48 so as to disengage all of the fingers 62 from beneath a cured section of the belting.

When the mechanism 60 is moved from the position illustrated in FIG. 18 to the left, its arms 61 engage the ends of two angularly directed guides 75 which are flared upwardly and outwardly on opposite sides of the upper platen 48 relative to the normal vertical positions of the arms 61. As the trolley 73 continues to move, the pairs of arms 61 are swung outwardly and upwardly in the direction indicated by the broken arrows in FIG. 23, until the respective fingers 62 of each of the arms 61 are withdrawn completely from beneath the belt section to be cured.

With reference particularly to FIGS. 23 and 24, it can be seen that each of the arms 61 has a shape which is substantially that of an inverted "L". The upper end of each of the arms 61 is pivotally mounted by a pin 76 in a crossframe 77 which is secured to the main beam 70. At their lower ends, each of the arms 61 has a pair of vertically spaced, outwardly extending hooks 78, each consisting of two spaced plates with notches cut in their upper edges. Each pair of fingers 62 comprises two parallel rods 79 which rigidly are mounted in a crossbar 80 and each is covered by a jacket 81. Each of the crossbars 80 is welded or otherwise rigidly attached to a vertical hanger 82, each hanger 82 having a pair of oppositely extending pins 83 which may removably be engaged in the notches in the hooks 78, and a short outwardly extending handle 84.

After each length of belting has been vulcanized and the overhead mechanism 60 moved outwardly and lowered to the position illustrated in FIGS. 13 and 23, the operator inserts one of the pairs of fingers 62 between the web of the belt 31 and the upper surface of the mold 35 with one finger on each side of one of the cleats 33, as shown in FIG. 24. The free ends of the fingers 62 are tapered slightly in order to facilitate this insertion (See FIG. 23). After all of the sets of the fingers 62 have been inserted in place from the opposite sides of the mechanism, as shown in FIG. 23, they are engaged with their hooks 78. The two hoists 72 are energized to pull the mechanism 60 upwardly to the level shown in FIG. 14. This holds the cured section of the belting upwardly above the now empty mold carriage 35.

A new set of the uncured cleat lengths 33a is placed in the mold recesses 37 (except for the recess 37a), and the drive mechanism for the trolley 73 is energized to move the overhead mechanism 60 forwardly to the position illustrated in FIG. 19. At the same time, of course, the take-up drum 55 is actuated to pull the molded and cured section of the belt along with the mechanism 60. The operator then unhooks the last set of fingers, indicated by the reference No. 62a in FIG. 19, allowing the last previously vulcanized cleat 33 to drop into the first cleat recess indicated by the reference No. 37a.

As described above in the section of this specification relating to the method, the powered winch 51 then is energized to wind up its "cable" 53, actually shown in the form of a flat belt in FIG. 21, which is yoked to the front end of the mold carriage 35 to pull the mold carriage from the position of FIG. 19 inwardly into the space between the platens 48 and 49. At the same time, the power take-up drum 55 again is energized to pull either a previously molded length of belt or, by means of the pulling belt 56, to move the belt along with the mold.

After a length of the belt has been vulcanized together, the overhead mechanism 60 is moved backwardly to a position overlying the carriageway 46 and then raised to the position illustrated in FIG. 20. The second powered winch 52 is energized to pull the mold carriage 35 back to the position shown in FIG. 12.

Figure 25:
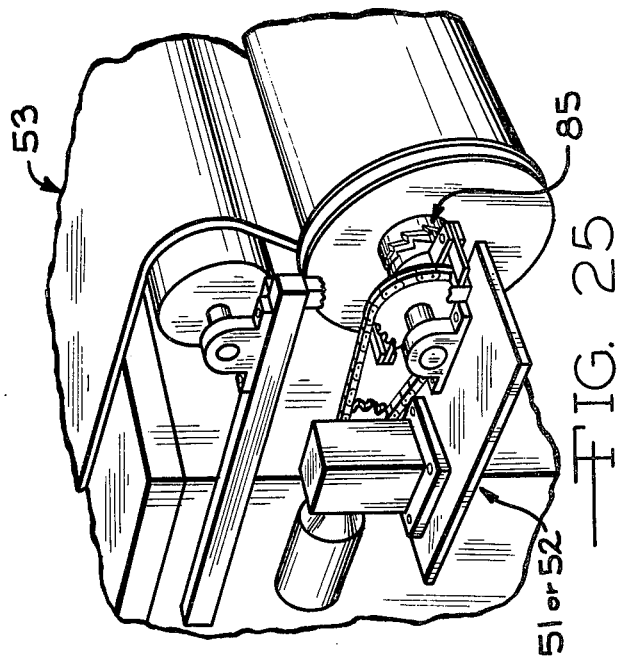
FIG. 25 is a fragmentary view in perspective on an enlarged scale illustrating a one-way drive mechanism employed in an apparatus embodying the invention.

With reference to FIG. 25, each of the winches 51 and 52 is a one-way drive mechanism. In other words, the winches 51 or 52 are alternately energized to pull the mold carriage in opposite directions. Each of them has a one-way clutch 85 which allows its respective drum to rotate freely in the direction opposite to that which it rotates when the winch is powered.

As can best be seen by reference to FIG. 2, the mold pulling cable 53, which is connected to the outer end of the mold 35, travels over a plurality of idler rollers 86 which extend along beneath the carriageway 46.

The mold casters 45 are illustrated in FIGS. 26 and 27. Each of the casters has a pair of side plates 87 and cross members 88 forming an open box. Each caster has a roller 89 which is mounted by a pin 90 and is carried by a bifurcated lever 91 which, in turn, is pivoted by a cross-pin 92. A coil spring 93 is compressed between the free end of the lever 91 and a pad 94 which biases the lever 91 to thrust the roller 89 downwardly with the limit of the travel thereof being controlled by a stop pin 95. Each of the casters 45 is mounted on the mold 35 by suitable bolts 96. Thus, when the mold is traveling on the carriage way and in and out of the space between the platens 48 and 49, the springs 93 hold their respective levers 91 in the position illustrated in FIGS. 26 and 27 and the mold travels on the rollers 89. However, when the lower platen 49 is moved upwardly as illustrated in FIG. 20, the rollers 89 are squeezed upwardly into the space between their side plates 87 further compressing the springs 93 so that the entire mold 35 is tightly compressed between the surfaces of the platens 48 and 49.

Having described my invention, I claim:

1. A method for fabricating a continuous length of cleated belting, said method comprising the steps of
   (a) positioning a plurality of elongated uncured cleats with their upper edges downwardly in complementary longitudinally spaced recesses in a moveable mold, such recesses extending generally laterally of the length of the belting being fabricated,
   (b) feeding a length of continuous belting base material from a supply forwardly over the mold and through between spaced heated press platens,
   (c) moving the mold and the base material concommitantly forwardly into position between the press platens,
   (d) closing the press platens and curing the cleats to the section of the base material that overlies the cleats,
   (e) opening the press platens,
   (f) moving the mold and the entire length of the base material including the cured section backwardly until the cured section is removed from between the press platens,
   (g) lifting the cured section upwardly for removing the cured cleats from the mold recesses,
   (h) positioning additional uncured cleats in all of the mold recesses except the first recess at the front of the moveable mold,
   (i) feeding the entire length of the base material including the cured section forwardly over and beyond the mold while progressively lowering the cured section downwardly toward the mold level and holding the mold stationary until the last cured cleat reaches a position overlying the first recess,
   (j) fitting the last cured cleat into the first recess,
   (k) moving the mold and the entire length of the base material forwardly through the space between the platens until the mold is positioned therebetween, and
   (l) serially repeating steps (d) through (k) until a desired length of continuous cleated belting has been fabricated.

2. In a method according to claim 1 lifting the cured section by simultaneously applying upwardly directed force to the base material along both sides of all of the cured cleats.

3. A method according to claim 1 in which the cured section is lifted upwardly for removing the cured cleats from the mold recesses by inserting pairs of lift fingers beneath the base material from opposite sides of the mold for each of the cured cleats with the lift fingers of each pair extending along opposite sides of the respective cleat and simultaneously raising all of the pairs of lift fingers.

4. In a method according to claim 3 moving the lift fingers forwardly above the mold for supporting the cured section while moving the cured section forwardly over and beyond the mold.

5. In a method according to claim 4 lowering the cured section toward the mold level as it moves beyond the mold by sequentially withdrawing opposed pairs of lift fingers as each respective cured cleat passes the front end of the mold.

6. Apparatus for fabricating a continuous length of cleated belting, said apparatus comprising, in combination,
   (a) a press having opposed, heated, planar platens and mechanism for opening and closing said press,
   (b) a mold carriageway extending rearwardly from and substantially at the level of the lower one of said platens,
   (c) means for forwardly feeding and rearwardly retracting a continuous web of belting base material over said carriageway and through the space between said platens,
   (d) a mold carriage having a plurality of spaced, generally laterally extending recesses in its upper surface, such recesses being complementary to the cleats to be cured to the base material, and
   (e) means for moving said mold carriage back and forth between a position on said carriageway and a position between said press platens.

7. Apparatus according to claim 6 and overhead mechanism for lifting a cured section of cleated belting upwardly relative to said mold carriage.

8. Apparatus according to claim 7 in which the overhead mechanism comprises a track extending longitudinally above the press and the mold carriageway, a trolley moveable along said track, arms depending from said trolley along both sides of said mold carriageway, a pair of fingers removeably mounted on the lower end of each of said arms and adapted to be inserted laterally inwardly beneath a cured section of the belting on the mold carriage along opposite sides of one of the cleat recesses therein, means for raising the lowering said arms, and means for moving said trolley back and forth along said track.

9. Apparatus according to claim 8 in which the arms are pivoted to the trolley for movement laterally outwardly relative to the mold carriage for withdrawing the fingers from beneath the belting and which has means for sequentially swinging each opposed pair of arms outwardly as the mold carriage is moved off of the carriageway and into the space between the press platens.

10. Apparatus according to claim 9 and guides for the arms, each extending from a rear position at the side and above the front end of the carriageway outwardly, upwardly and forwardly along the side of the press, the guides being engaged by those of said arms on the respective side of said carriageway as said trolley moves forwardly along the track for swinging the associated arms outwardly and upwardly for withdrawing the fingers out from beneath the cured section of the cleated belting as said cured section is fed forwardly over the mold carriage.

11. Apparatus according to claim 6 in which the mold carriage comprises a mold consisting of a plurality of modular elements, each of said elements being generally rectangular in plan view with a recess in one of its major faces that is complementary to a cleat to be cured, the other of its major faces being substantially planar, each of said elements having means along its front and rear lateral edges for assembly to adjacent elements with either of said major faces turned upwardly.

12. Apparatus according to claim 10 and resiliently retractable casters for supporting the mold on the carriageway and the lower one of the press platens.

* * * * *